(12) United States Patent
Inoue et al.

(10) Patent No.: US 6,464,061 B1
(45) Date of Patent: Oct. 15, 2002

(54) CLUTCH DEVICE

(75) Inventors: Masahiro Inoue, Osaka (JP); Isao Usuki, Osaka (JP); Koji Shima, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/868,027

(22) PCT Filed: Oct. 13, 2000

(86) PCT No.: PCT/JP00/07144

§ 371 (c)(1),
(2), (4) Date: Jun. 13, 2001

(87) PCT Pub. No.: WO01/27486

PCT Pub. Date: Apr. 19, 2001

(30) Foreign Application Priority Data

| Oct. 14, 1999 | (JP) | ............................................. 11-292099 |
| Dec. 13, 1999 | (JP) | ............................................. 11-352706 |
| Apr. 18, 2000 | (JP) | ........................................ 2000-116133 |
| Apr. 20, 2000 | (JP) | ........................................ 2000-119052 |
| Apr. 25, 2000 | (JP) | ........................................ 2000-123821 |

(51) Int. Cl.$^7$ ............................................. F16D 67/02
(52) U.S. Cl. ..................................... 192/223.3; 188/134
(58) Field of Search ......................... 192/223.3; 188/134

(56) References Cited

U.S. PATENT DOCUMENTS

| 3,194,366 A | * | 7/1965 | Hensel .................... 160/173 R |
| 4,480,733 A | * | 11/1984 | Grimm et al. ............ 192/223.3 |
| 4,597,477 A | * | 11/1984 | Miller ......................... 188/134 |
| 4,483,429 A | * | 7/1986 | Tiedeman .................. 192/18 R |
| 5,944,148 A | * | 3/1990 | Bae et al. .................... 188/134 |
| 4,909,363 A | * | 8/1999 | Trommer ..................... 188/134 |

FOREIGN PATENT DOCUMENTS

| EP | 1143162 | 10/2001 |
| JP | 62-146788 | 6/1987 |
| JP | 8-93786 | 4/1996 |
| JP | 10-2356 | 1/1998 |
| JP | 10-30656 | 2/1998 |
| JP | 10-169674 | 6/1998 |

* cited by examiner

*Primary Examiner*—Saul Rodriguez
(74) *Attorney, Agent, or Firm*—Jordan and Hamburg LLP

(57) ABSTRACT

An object of the present invention is to provide a clutch device capable of providing a simple structure, greatly reducing power-application cost and component cost, reducing weight and improving convenience. The clutch device is constituted to include a movable cam plate attached to be rotatable synchronously with a second rotary shaft and to be displaceable in an axial direction, a clutch housing which the movable cam plate is press-contacted with or separated from depending on a displacement of the movable cam plate in the axial direction, and a cam mechanism for separating the movable cam plate from the clutch housing, integrating a first rotary shaft, the movable cam plate and the second rotary shaft with one another and coupling the both rotary shafts to be synchronously rotatable when the first rotary shaft rotates, and for press-contacting the movable cam plate with the clutch housing, integrating the second rotary shaft, the movable plat and the clutch housing with one another and turning the second rotary shaft into an irrotational state when the second rotary shaft rotates.

12 Claims, 15 Drawing Sheets

F I G. 1
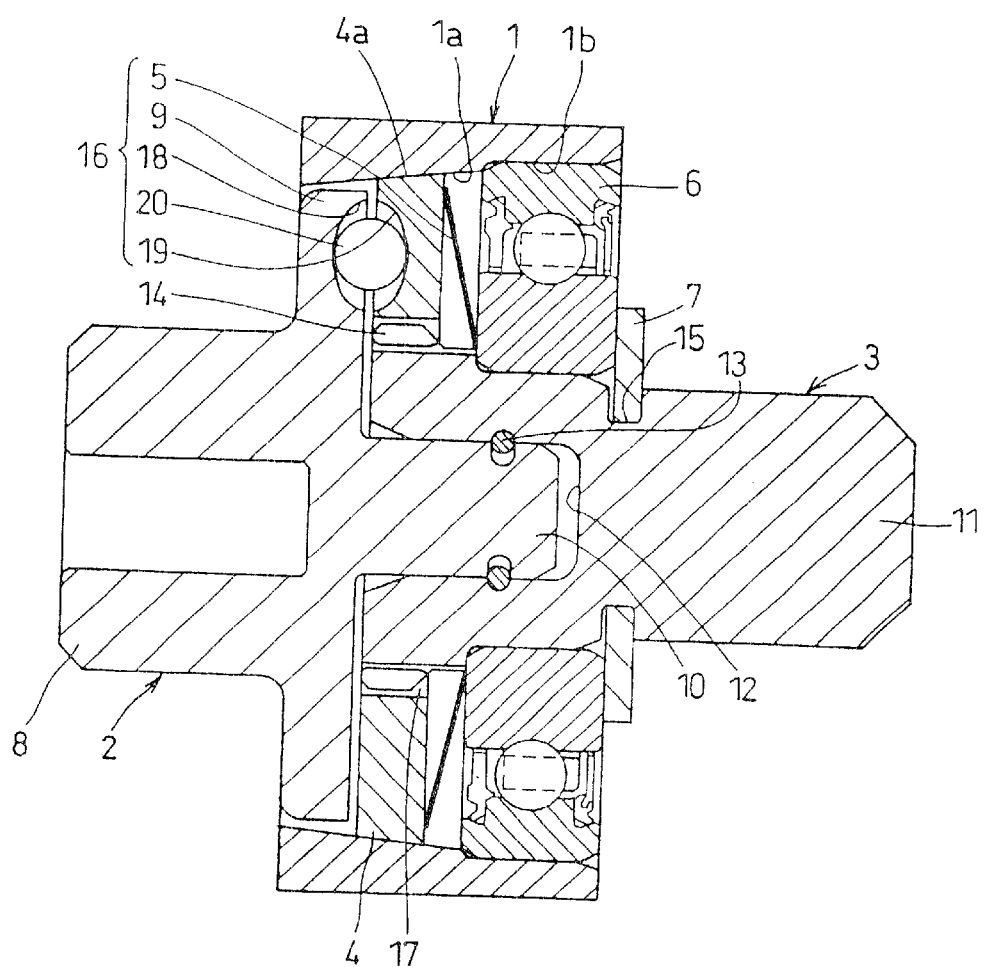

F I G. 2
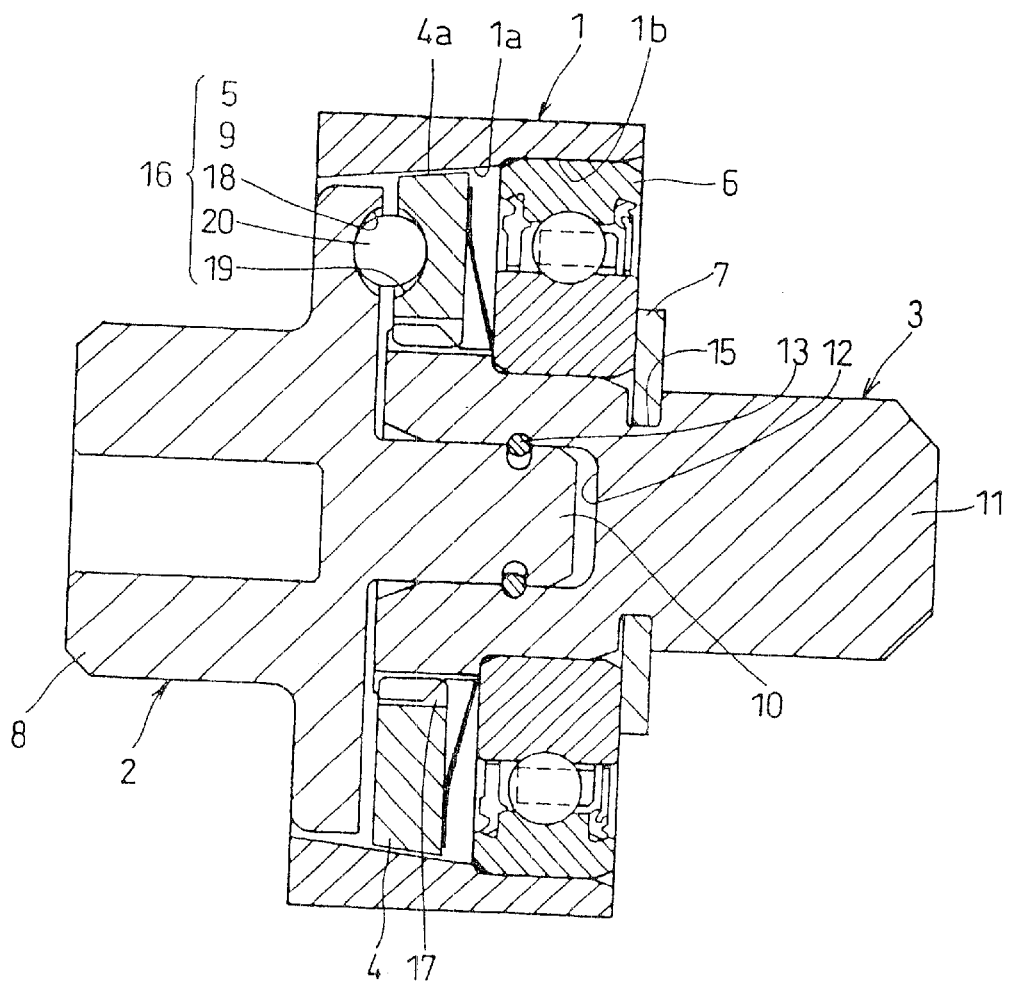

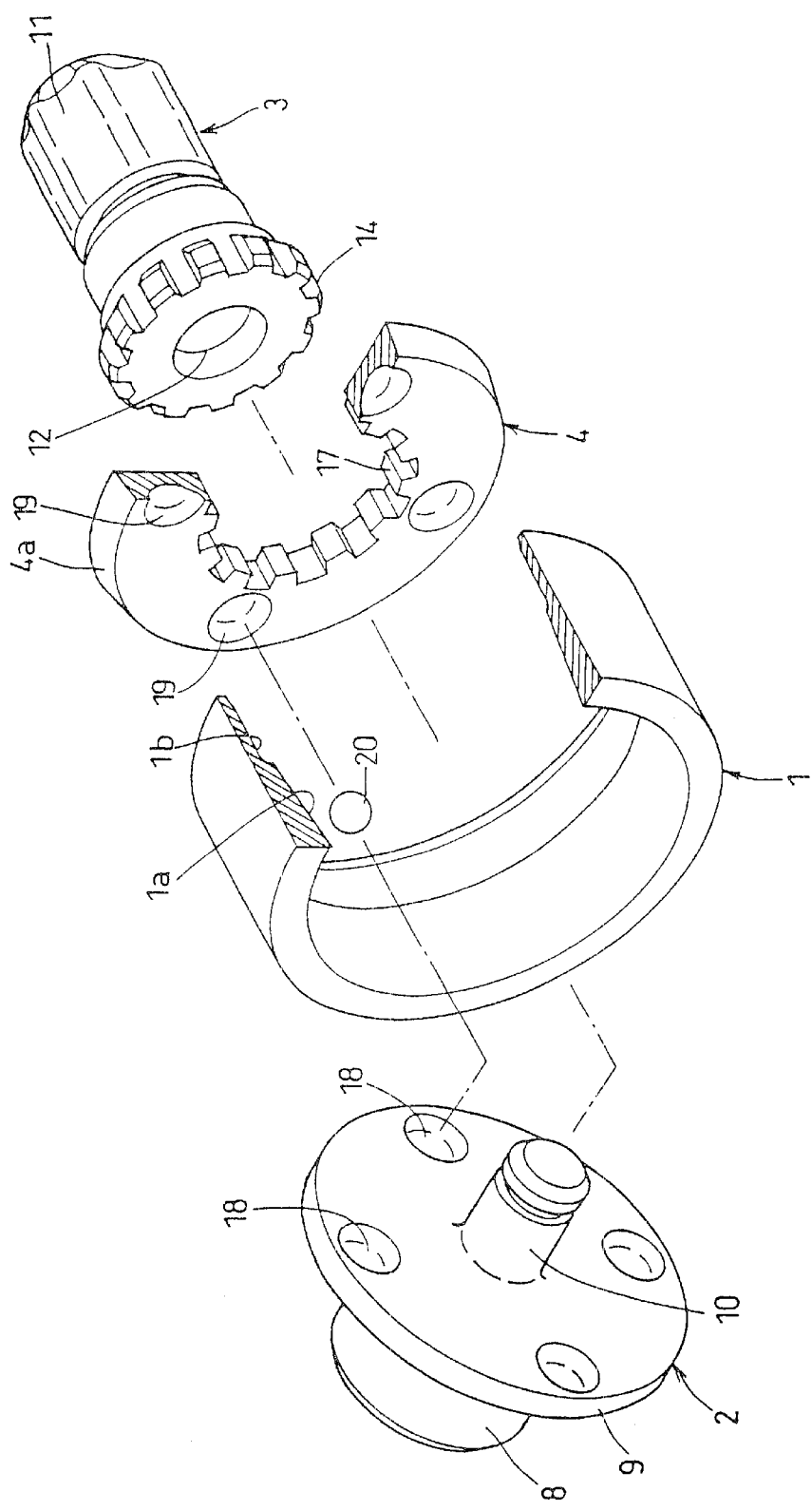
F I G. 3

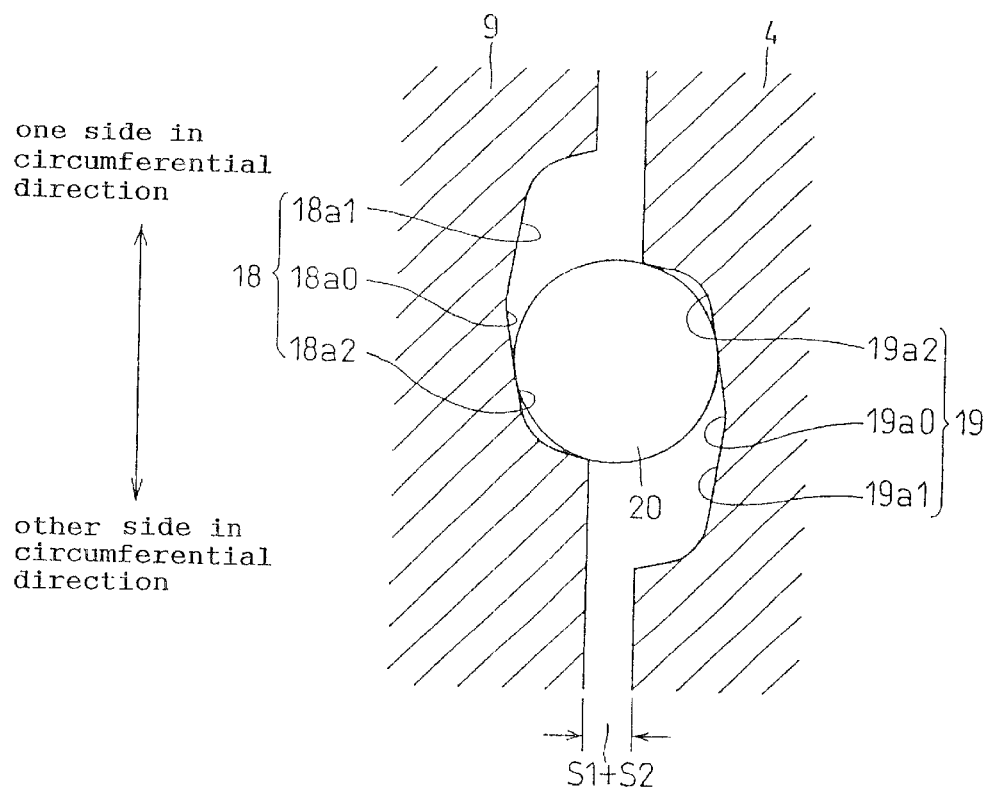
F I G. 5

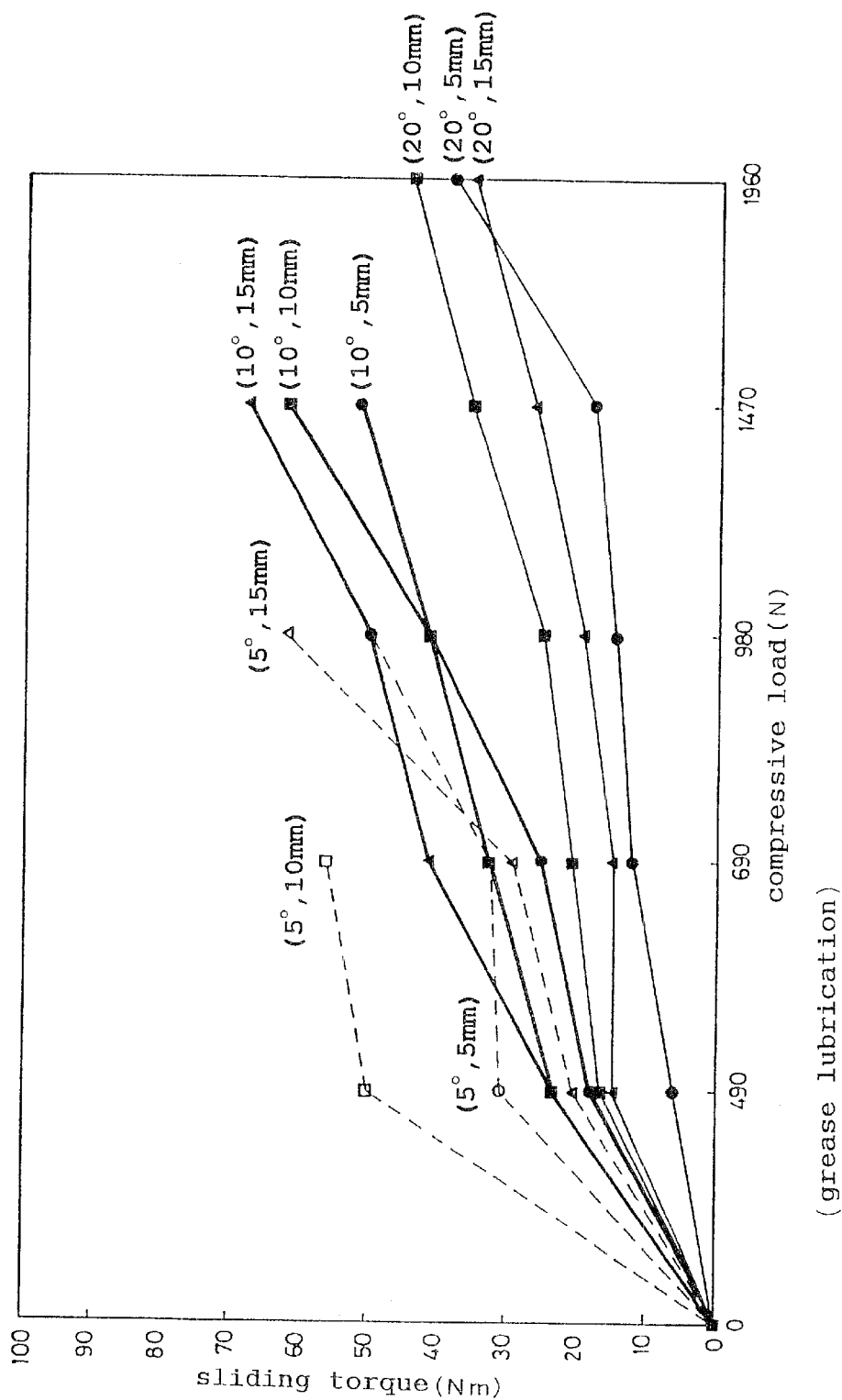
F I G. 12
(grease lubrication)

CLUTCH DEVICE

TECHNICAL FIELD OF THE INVENTION

The present invention relates to a clutch device for coupling two rotating bodies provided to be opposite each other almost concentrically to allow the bodies to rotate synchronously when rotational power is inputted from a first rotating body side, and for cutting off rotational power to the first rotating body when the rotational power is inputted from a second rotating body side.

BACKGROUND OF THE INVENTION

In a conventional clutch device of this type wherein the first rotating body is driven to rotate by a power source such as a motor and this rotational power is transmitted to the second rotating body, when rotational power in counter direction is inputted from the second rotating body, a worm reduction gear or an electromagnetic brake is adopted as a mechanism for cutting off the transmission of the rotational power to the first rotating body (or cutting off inverse input).

In case of the worm reduction gear, the transmission efficiency of the first rotating body with respect to the second rotating body is low. Besides, since gear sound is generated by the engagement of a worm gear and a worm, the clutch device is inferior in soundless characteristics.

In case of the electromagnetic brake, the supply of power is required to perform a braking operation to thereby push up operation costs and a complex electronic control circuit is required to control the supply of power to an electromagnetic coil which controls the transmission timing of rotational power to thereby push up production costs.

Moreover, in either case, there is a limit to the intent to provide a lighter clutch device.

It is, therefore, an object of the present invention to provide a clutch device excellent in transmission characteristics for the rotational power of the first rotating body, excellent in soundless characteristics, capable of greatly reducing costs by being constituted out of a simple structure and capable of realizing a lightweight.

DISCLOSURE OF THE INVENTION

According to the present invention, a clutch device for coupling two rotating bodies provided to be opposite each other almost concentrically so as to be synchronously rotatable when rotational power is inputted into a first rotating body out of the two rotating bodies, and for cutting off rotational power to the first rotating body when the rotational power is inputted into a second rotating body out of the two rotating bodies, is characterized by comprising: a movable frictional member rotatable synchronously with the second rotating body, and attached to be displaceable in an axial direction; a fixed frictional member fixedly arranged at a position at which the movable frictional member is press-contacted with or separated from the fixed frictional member depending on a displacement of the movable frictional member in the axial direction; and a cam mechanism for separating the movable frictional member from the fixed frictional member, integrating the first rotating body, the movable frictional member and the second rotating body with one another and coupling the first and second rotating bodies to be synchronously rotatable when the first rotating body rotates, and for press-contacting the movable frictional member with the fixed frictional member, integrating the second rotating body, the movable frictional member and the fixed frictional member with one another and turning the second rotating body into an irrotational state when the second rotating body rotates.

According to the present invention, the movable frictional member, the fixed frictional member and the cam mechanism can transmit the rotational power of the first rotating body to the second rotating body with high efficiency and the structure becomes simple to thereby make it possible to reduce operation and production costs.

According to the present invention, in the above-stated improved clutch device, the movable frictional member has an outer peripheral surface consisting of an annular plate formed into a tapered surface which diameter becomes larger toward one side in the axial direction; the fixed frictional member has an inner peripheral surface formed as a tapered surface which diameter becomes larger toward one side in the axial direction, and has an inner peripheral surface consisting of a cylindrical body concentrically provided on the outer peripheral surface of the movable frictional member; and if the movable frictional member is displaced in the axial direction, the tapered outer peripheral surface of the movable frictional member is turned into a state of being press-contacted with or separated from the tapered inner peripheral surface of the fixed frictional member.

In this case, since the clutch device has a simple structure in which the movable frictional member is press-contacted with or separated from the fixed movable frictional member on the tapered surfaces of the movable frictional member and the fixed frictional member, the operation and production costs of the clutch device can be reduced.

According to the present invention, in the above-stated improved clutch device, the cam mechanism includes cam grooves provided on respective opposite surfaces of the first rotating body and the movable frictional member, and a clutch ball inserted between the cam grooves. The clutch ball rolls in the cam grooves in circumferential direction to thereby displace the movable frictional member to be press-contacted with or separated from the fixed frictional member.

In this case, since the cam mechanism consists of the cam grooves and the clutch ball, the rotational power of the first rotating body can be transmitted to the second rotating body with high efficiency and the structure becomes simple to thereby make it possible to reduce operation and production costs.

According to the present invention, in the above-stated improved clutch device, the cam mechanism includes a pair of cam grooves respectively provided on opposite surfaces of the first rotating body and the movable frictional member and a cam-shaped convex portion. The cam-shaped convex portion rolls in the cam grooves in circumferential direction, to thereby displace the movable frictional member to be press-contacted or separated from the fixed frictional member.

In this case, since the cam mechanism consists of the cam grooves and the cam-shaped convex portion, the rotational power of the first rotating body can be transmitted to the second rotating body with high efficiency and the structure becomes simple to thereby make it possible to reduce operation and production costs.

According to the present invention, in the above-stated improved clutch device, an urging member for elastically urging the movable frictional member toward a side of being press-contacted with the fixed frictional member, is attached.

In this case, since the clutch device has a structure of press-contacting the movable frictional member with the fixed frictional member using the urging member, the synchronous rotating operation of the first rotating body and the second rotating body and the separating operation of separating the second rotating body from the first rotating body can be performed more smoothly.

BRIEF DESCRIPTION OF THE DRAWINGS

FIG. 1 is a side sectional view of a clutch device in a power cutoff state according to the most preferred embodiment of the present invention;

FIG. 2 is a side sectional view of the clutch device shown in FIG. 1 in a power transmission state;

FIG. 3 is an exploded perspective view of the clutch device shown in FIG. 1;

FIG. 5 is an enlarged view of the important parts of the cam mechanism shown in FIG. 2;

FIG. 12 shows the relationship between compressive load and sliding torque in case of grease lubrication in the clutch device shown in FIG. 11;

DESCRIPTION OF THE MOST PREFERRED EMBODIMENT OF THE INVENTION

The most preferred embodiment of the present invention will be described hereinafter in detail with reference to the drawings.

Figure 4:
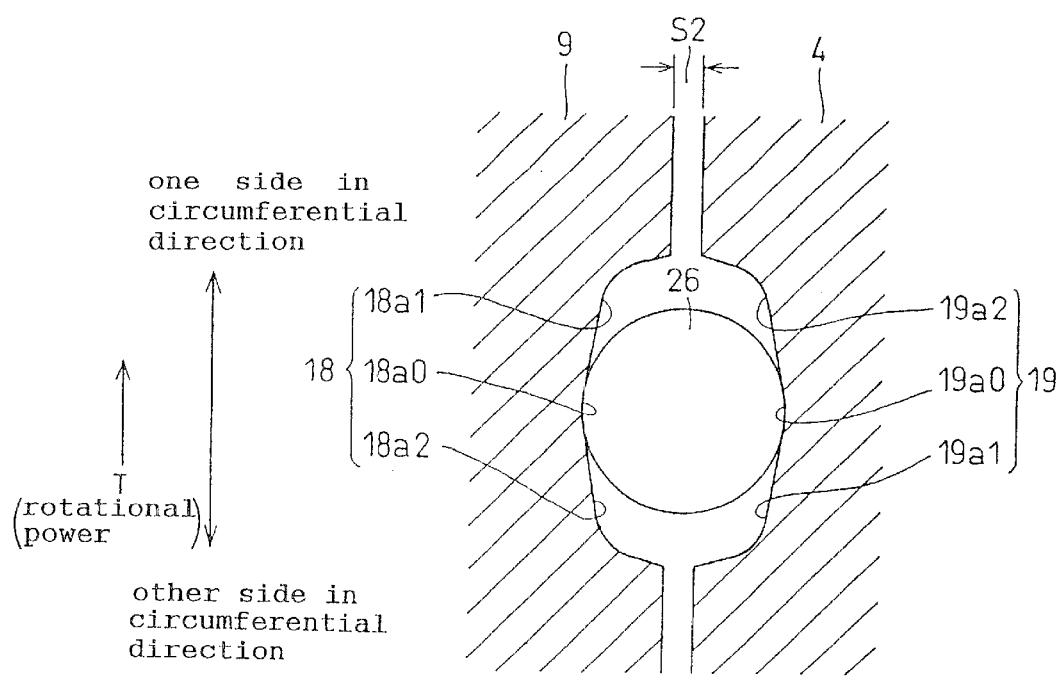
FIG. 4 is an enlarged view of the important parts of a cam mechanism shown in FIG. 1.

FIGS. 1 to 5 relate to the most preferred embodiment of the present invention. FIG. 1 is a side sectional view of a clutch device in a power cutoff state. FIG. 2 is a side sectional view of the clutch device in a power transmission state. FIG. 3 is an exploded perspective view of the clutch device. FIG. 4 is an enlarged view of the important parts of FIG. 1. FIG. 5 is an enlarged view of the important parts of FIG. 2.

In FIGS. 1 to 5, reference symbol 1 denotes a clutch housing serving as a fixed frictional member, 2 denotes the first rotary shaft serving as the first rotating body, 3 denotes the second rotary shaft serving as the second rotating body, 4 denotes a movable cam plate as one example of a movable frictional member, 5 denotes a disc spring as one example of an urging member, 6 denotes a rolling bearing and 7 denotes a locating snap ring.

The clutch housing 1 is constituted as a cylindrical structure in which the housing 1 is fixed to a clutch device attachment wall, not shown, and is provided with a fixed contact surface 1a which diameter is larger toward one axial direction on one axial direction-side inner peripheral surface of the housing 1 and a bearing attachment surface 1b on the other axial direction side thereof.

The first rotary shaft 2 is driven to rotate by a power source such as a motor. A fixed cam plate 9 directed outward in diameter direction is formed integrally with the outer peripheral surface of a rotary shaft main body 8 and a small diameter shaft portion 10 in axial direction is formed on the axial end face of the rotary shaft main body 8.

The second rotary shaft 3 has a shaft portion 11 in one axial direction, which portion 11 extends outside of the housing 1. The small diameter shaft portion 10 of the first rotating body 2 is fitted into an axial bottomed hole 12 formed on an axial end face on the other axial direction side and coupled to the first rotary shaft 3 by cisclips 13.

Also, the second rotary shaft 3 has a spline teeth 14 formed on the outer peripheral surface thereof and is rotatably supported by the bearing attachment surface 1b of the clutch housing 1 through the bearing 6.

In this case, the locating snap ring 7 is fixed to a peripheral groove 15 on the outer peripheral surface of the second rotary shaft 3, thereby preventing the second rotary shaft 3 or the like from slipping out from the clutch housing 1.

The movable cam plate 4 is constituted as an annular plate structure including a movable contact surface 4a having an outer peripheral surface in diameter direction, the diameter of which surface is larger toward one axial direction and in which the cam plate 4 is arranged concentrically with the clutch housing 1 so that the movable contact surface 4a is opposite to the fixed contact surface 1a of the clutch housing 1. A cam mechanism 16 is formed between the respective axially opposite surfaces of the movable cam plate 4 and the fixed cam plate 9.

In addition, the movable cam plate 4 has a fitting hole for fitting the second rotary shaft 3 and a spline teeth 17 formed on the inner peripheral wall of the fitting hole and fitted into the spline teeth 14 of the second rotary shaft 3. If the spline teeth 17 is fitted into the spline teeth 14 of the second rotary shaft 3, the movable cam plate 4 rotates integrally with the second rotary shaft 3 and can be displaced in axial direction.

The cam mechanism 16 consists of cam grooves 18 and 19 formed in the respective opposite surfaces of the movable cam plate 4 and the fixed cam plates 9, and a clutch ball 20 inserted between the cam grooves 18 and 19.

The cam grooves 18 and 19 are formed equidistantly on a plurality of portions in circumferential direction. The cam grooves 18 and 19 have a structure in which the depths of the grooves are larger on central sides 18a0 and 19a0 in diameter direction and smaller on both sides 18a1, 18a2 and 19b1, 19b2 in diameter direction.

The disc spring 5 is inserted into the outer periphery of the second rotary shaft 3 between the respective axially opposite surfaces of the movable cam plate 4 and the bearing 6. The disc spring 5 urges the movable cam plate 4 in the direction of the fixed cam plate 9.

The cam mechanism 16 is constituted such that when the first rotary shaft 2 rotates, the movable cam plate 4 is separated from the clutch housing 1 and the first rotary shaft 2, the movable cam plate 4 and the second rotary shaft 3 are integrated with one another to thereby allow the both rotary shafts 2 and 3 to rotate synchronously with each other.

Further, the cam mechanism 16 is constituted such that when the second rotary shaft 3 rotates, the movable cam plate 4 is press-contacted with the clutch housing 1 and the second rotary shaft 3, the movable cam plate 4 and the clutch housing 1 are integrated with one another to thereby turn the second rotary shaft 3 into an irrotational state.

Now, the function of the clutch device will be described.

In the state shown in the drawings, the movable cam plate 4 is urged by the disc spring 5 toward the other side in axial direction and the movable contact surface 4a of the plate 4 is press-contacted with the fixed contact surface 1a of the clutch housing 1. The rotation of the second rotary shaft 3 is, therefore, locked and t he shaft 3 is in an irrotational state.

On the other hand, if the first rotary shaft 2 is driven by the power source such as a motor, not shown, to rotate from the state shown in the drawings, the clutch ball 20 rolls in circumferential direction between the cam grooves 18 and 19 between the respective opposite surfaces of the fixed cam plate 9 and the movable cam plate 4. Then, the movable cam plate 4 is displaced against the disc spring 5 toward one side in axial direction with respect to the fixed cam plate 9, whereby the movable contact surface 4a of the movable cam plate 4 is separated from the fixed contact surface 1a of the clutch housing 1.

Due to this, the movable cam plate 4 rotates by the rotational power of the first rotary shaft 2 and the second rotary shaft 3 rotates accordingly, whereby the rotational power of the first rotary shaft 2 is transmitted.

The clutch device in this embodiment having the above-stated structure is capable of transmitting the rotational power of the first rotary shaft 2 to the second rotary shaft 3 with high efficiency. Besides, since the structure of transmitting rotational power from the first rotary shaft 2 to the second rotary shaft 3 and separating the second rotary shaft 3 in an irrotational state from the first rotary shaft 2 is simple, it is possible to reduce operation costs and production costs of the clutch device in this embodiment.

It is noted that the present invention should not be limited to the above-stated most preferred embodiment and that various applications or modifications to be described hereinafter can be made.

Figure 6:
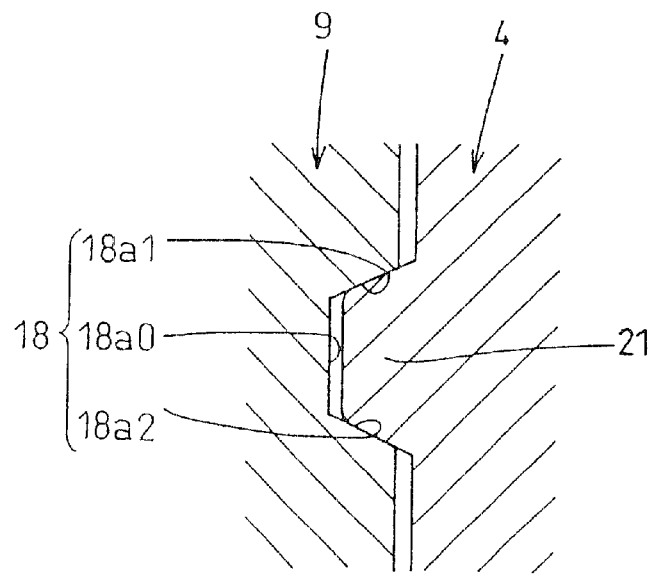
FIG. 6 is an enlarged view of the important parts of a cam mechanism in the clutch device according to another embodiment of the present invention, which important parts correspond to those shown in FIG. 4.
Figure 7:
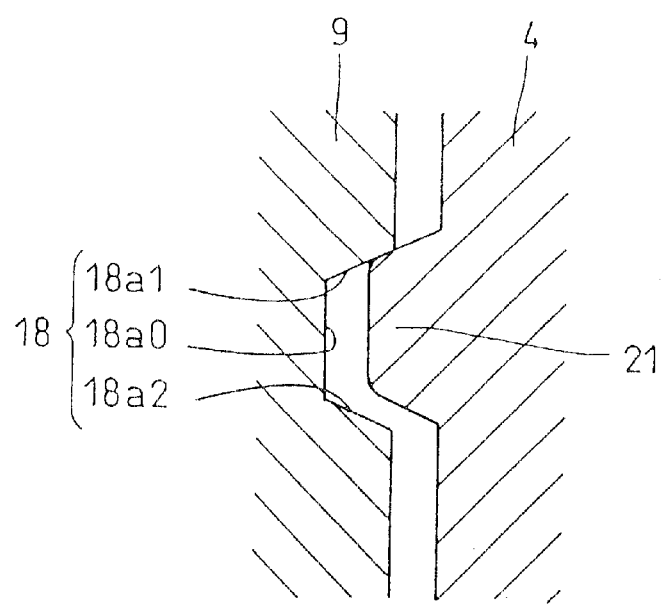
FIG. 7 is an enlarged view of the important parts of the cam mechanism in the clutch device shown in FIG. 6, which important parts corresponds to those shown in FIG. 5.

(1) According to the present invention, as shown in FIGS. 6 and 7, the cam groove 18 may be formed in the first rotary shaft 2 and a cam-shaped convex portion 21 facing opposite to the cam groove may be formed on the movable cam plate 4. The cam groove 18 and the cam-shaped convex portion 21 are trapezoidal in cross section. If the cam-shaped convex portion 21 is contained in the inclined surfaces 18a1 and 18a2 of the cam groove 18 as shown in FIG. 6, then the rotational power of the movable cam plate 4 is converted into an axial driving force and the movable cam plate 4 is displaced from an annular flange 9 toward one side in axial direction against the disc spring 5. As a result, the movable contact surface 4a of the movable cam plate 4 is separated from the fixed contact surface 1a on the inner peripheral surface of the clutch housing 1.

Since FIG. 6 corresponds to FIG. 4 and FIG. 7 corresponds to FIG. 5, no further description will be given thereto.

In this case, it is also possible to provide the cam groove 18 in the movable cam plate 4 and the cam-shaped convex portion 21 on the first rotary shaft 2.

(2) According to the present invention, one surface of the clutch housing 1 may face opposite to one surface of the movable cam plate 4 in axial direction and the opposite surface of the movable cam plate 4 may be press-contacted with or separated from the opposite surface of the clutch housing 1 by displacing the movable cam plate 4 in axial direction.

Figure 8:
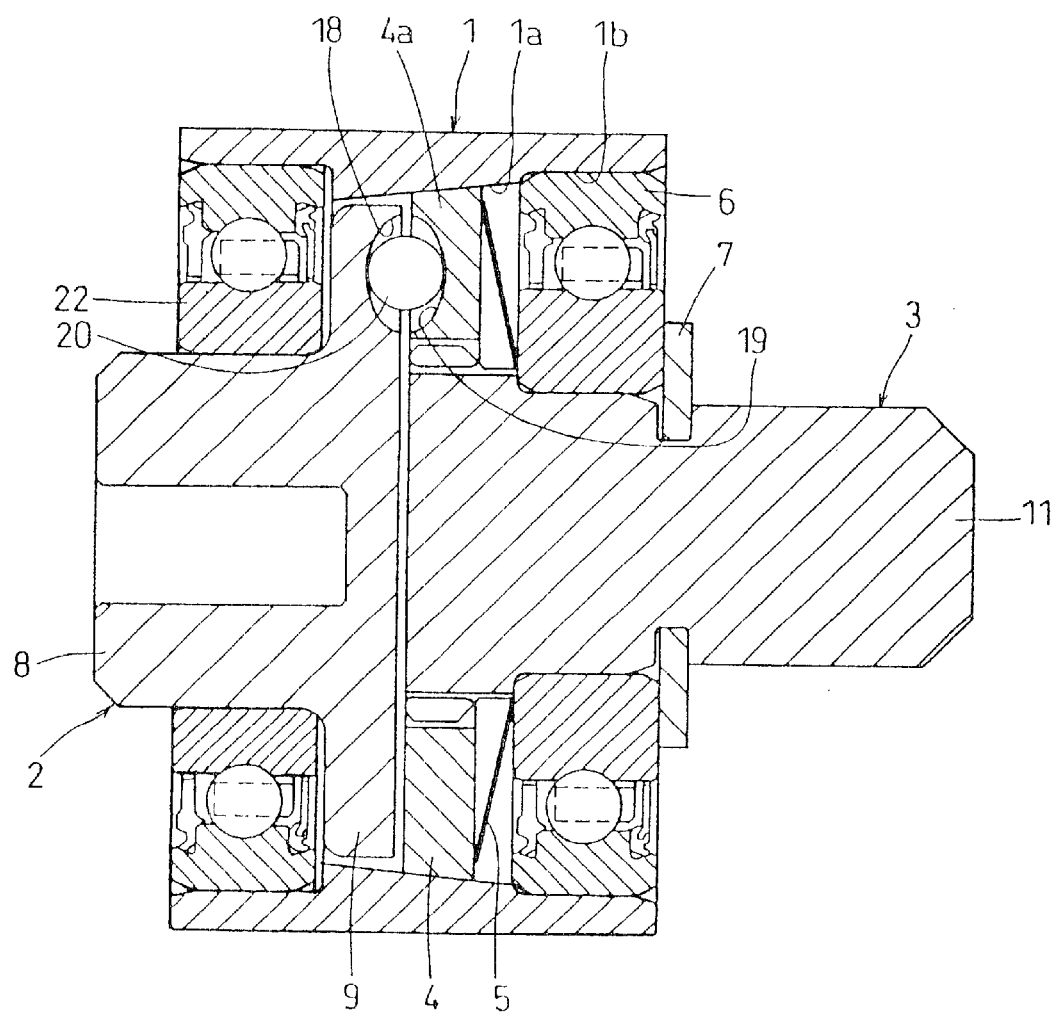
FIG. 8 is a side sectional view of a clutch device according to yet another embodiment of the present invention.

(3) According to the present invention, cisclips 13 for preventing the shift of the relative position of the first rotary shaft 2 to the second rotary shaft 3 because of the reactive force of the disc spring 5 may be eliminated and the rotary shaft 2 may be rotatably supported by the clutch housing 1 through rolling bearing 22 as shown in FIG. 8.

Figure 9:
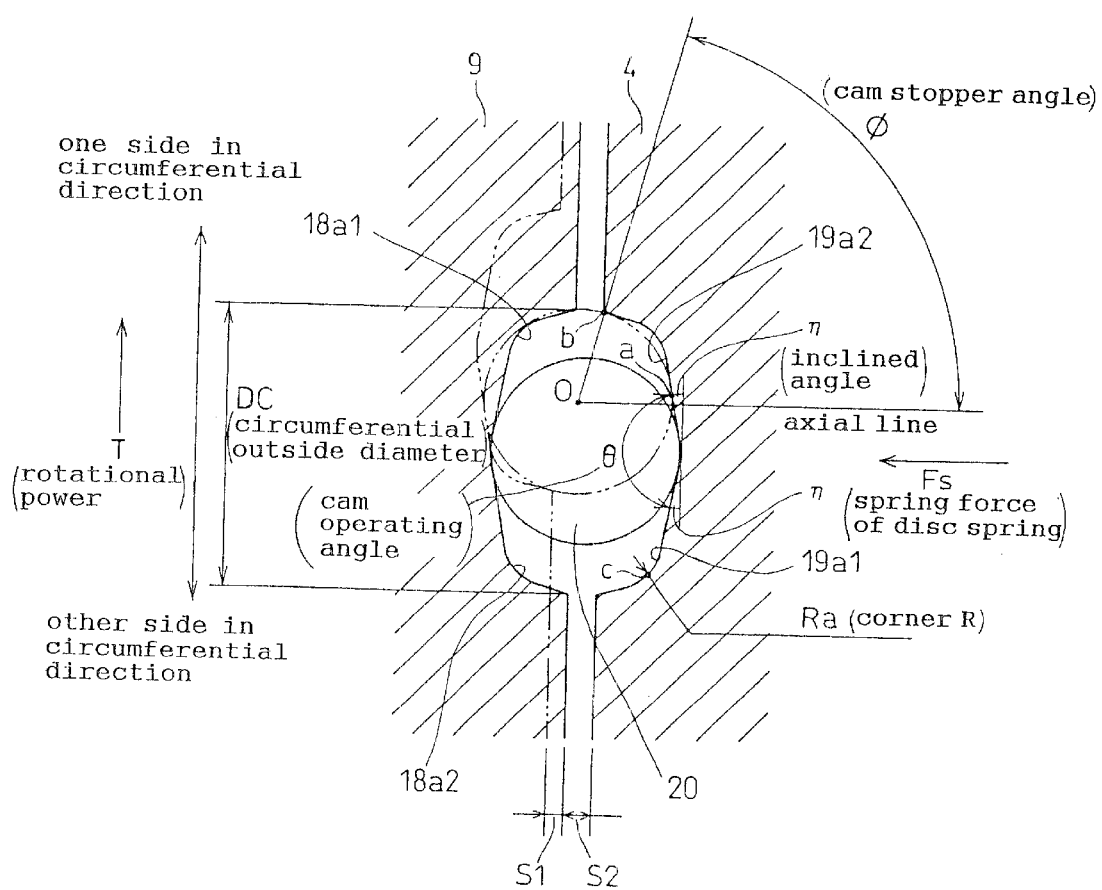
FIG. 9 is an enlarged view of the important parts of a cam mechanism in a clutch device according to yet another embodiment of the present invention.

(4) According to the present invention, the dimensions of the cam grooves 18 and 19 may be set as follows so as to prevent the clutch ball 20 from slipping out of the cam grooves 18 and 19 as shown in FIG. 9.

Namely, the depths (at circumferential centers 18a and 19a0) of the cam grooves 18 and 19 at the deepest position of the clutch ball 20 may be smaller than the radius of the clutch ball 20. In addition, when the clutch ball 20 is at point a on a cone-shaped inclined surface, the dimension of point b or the stepped portion of the cam groove may satisfy the following formulas (a) to (c):

$$\tan \phi > (2 \cdot T)/(D_P \cdot F_S) \text{ and } D_B/2 > R_a \quad \text{(a)}$$

$$D_C > (S_1/\tan \eta) + D_B \cdot \sin \phi \quad \text{(b)}$$

$$S_2 < D_B \cdot \cos \phi - S_1 \quad \text{(C)}.$$

In the expressions, symbols indicate as follows:

$S_1$: axial largest displacement quantity of clutch ball 20, $S_2$: axial shortest separation distance between first rotary shaft 2 and movable cam plate 4, $D_P$: pitch circle diameter of clutch ball 20, $D_B$: diameter of clutch ball 20, $D_C$: circumferential outside diameter of cam grooves 18 and 19, θ: cam operating angle, φ: cam stopper angle, η: inclined angle of cone-shaped inclined surface [(π−θ)/2], T: rotational power, $F_s$: spring force of disc spring 5, and $R_a$: corner R.

Here, the cam operating angle θ is the opening angle between the cone-shaped inclined surfaces 18a1 and 18a2 adjacent each other and centering around the circumferential center 18a0, i.e., the deepest position in case of the cam groove 18 of the first rotary shaft 2, and the opening angle between the cone-shaped inclined surfaces 19a1 and 19a2 adjacent each other in circumferential direction in case of the cam groove 19 of the movable cam plate 4.

The cam stopper angle φ is an angle between contact point a between the clutch ball 20 and the cone-shaped inclined surface, and an axial line passing the center of the clutch ball 20 in a state in which the clutch ball 20 is put between the circumferential other side of the cone-shaped inclined surface 18a1 of the cam groove 18 and the circumferential one side of the cone-shaped inclined surface 19a1 of the cam groove 19 or in a state in which the circumferential one side of the cone-shaped inclined surface 18a2 of the cam groove 18 and the circumferential other side of the cone-shaped inclined surface 19a2 of the cam groove 19.

Further, if the corner R between the plane in contact with the clutch ball 20 and the cone-shaped inclined surface at the point b is larger than the radius of the clutch ball 20, the clutch ball 20 easily runs upon the grooves 18 and 19. To prevent this, therefore, Ra is set smaller than the radius of the clutch ball 20.

Now, the meanings of the expressions (a) to (c) will be described.

The left side of the expression (a) indicates the relationship between the rotational power T and the cam stopper angle φ and the right side thereof indicates conditions for preventing the clutch ball 20 from running upon the grooves simply at the cam stopper angle φ.

The expression (b) indicates restrictions on the circumferential outside diameter of the cam grooves 18 and 19.

The expression (c) indicates conditions in terms of a depth relationship under which conditions the clutch ball 20 always has a contact surface even at a cam stopper angle of φ.

With the relationships of these expressions, it is necessary that the depth of the reference position c of this cam angle Ra satisfies these expressions (a) to (c) in the embodiment so as to prevent the clutch ball 20 from slipping out.

The function of the cam mechanism 16 which satisfies these expressions will be described.

If rotational power is not applied to the first rotary shaft 2 and the grooves 18 and 19 are opposite each other in axial direction as indicated by a solid line shown in FIG. 9, then the clutch ball 20 is located between the circumferential centers 18a and 19a0 of the cam grooves 18 and 19, respectively and the movable cam plate 4 is opposite to the first rotary shaft 2 by the shortest separation distance S2 in axial direction. In this state, the movable cam plate 4 is urged toward the other side in axial direction by the disc spring 5 and the movable contact surface 4a of the plate 4 is press-contacted with the fixed contact surface 1a of the clutch housing 1. As a result, the rotation of the second rotary shaft 3 is locked and the second rotary shaft 3 is in an irrotational state.

If the first rotary shaft 2 is driven to rotate by the power source such as a motor, not shown, from this state, the clutch ball 20 rolls on the cone-shaped inclined surfaces 18a2 and 19a2 or 18a1 and 19a1 of the both cam grooves 18 and 19 and the clutch ball 20 is put between the both sides of the cone-shaped inclined surfaces as indicated by a virtual line shown in FIG. 9.

In this state, the separation distance between the first rotary shaft 2 and the movable cam plate 4 is S1+S2 and, as already stated above, the rotational power of the first rotary shaft 2 is transmitted to the second rotary shaft 3.

At this stage, even if the first rotary shaft 2 rotates further, the clutch ball 20 is prevented from slipping out of the cone-shaped inclined surfaces of the cam grooves 18 and 19 because the cam grooves 18 and 19 satisfy the above-stated relational expressions. Thus, the clutch device provides excellent structural reliability.

Figure 10:
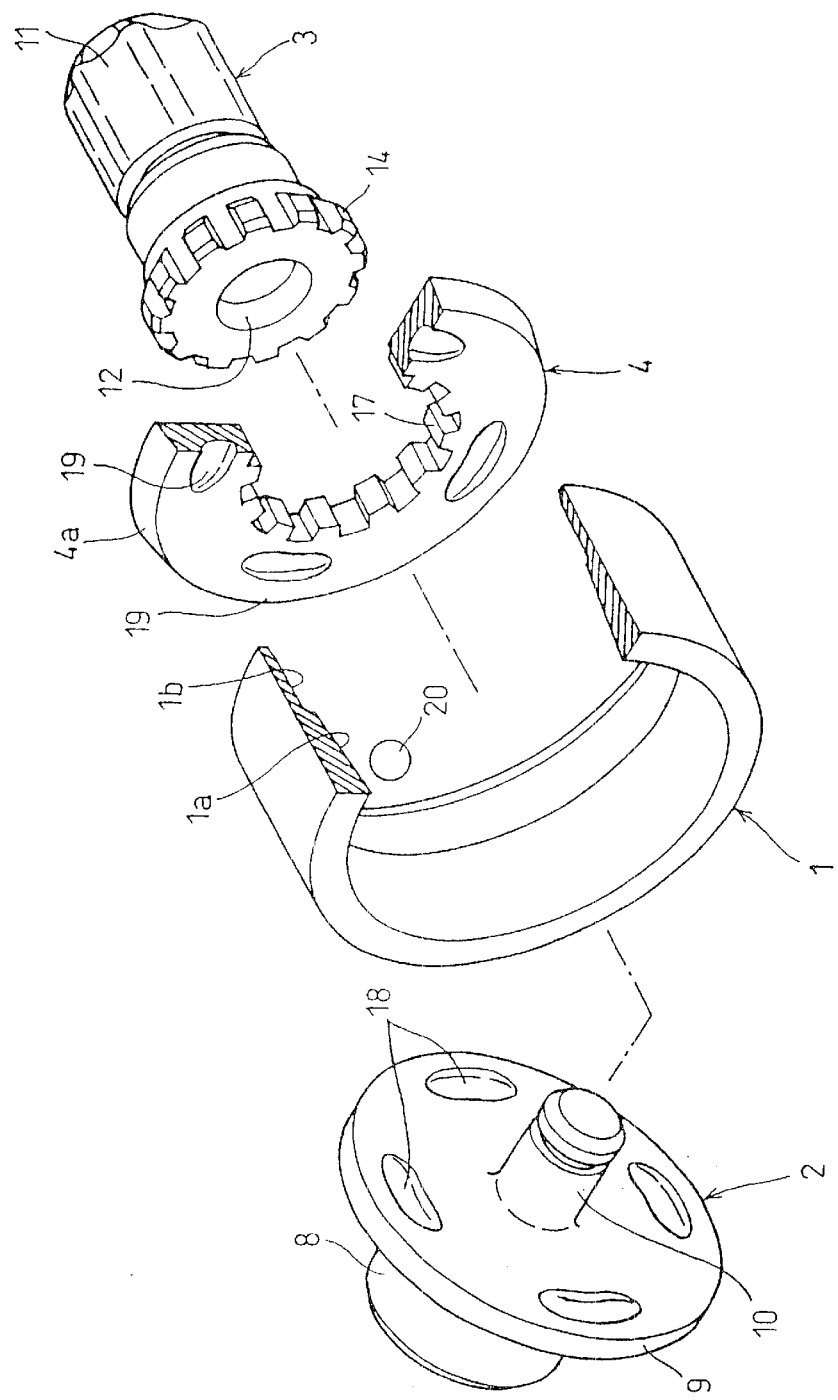
FIG. 10 is an exploded perspective view of a clutch device according to yet another embodiment of the present invention.

(5) According to the present invention, with a view of making the shape of the entire cam mechanism small in size, the widths of the cam grooves 18 and 19 in diameter direction may be set to restrict the rolling of the clutch ball 20 in diameter direction within a required level and to make the rolling thereof almost uniform in circumferential direction as shown in FIG. 10. For example, the cam mechanism may be formed into a generally ellipsoidal shape, a generally oval shape or the other similar shapes if seen from axial direction.

To be specific, the distance between a pair of inside and outside diameter walls opposite each other in diameter direction of the cam grooves 18 and 19, i.e., a groove width in diameter direction is set almost close to the diameter of the clutch ball 20 to such an extent that the clutch ball 20 can roll in circumferential direction.

Since the inside and outside diameter walls of each of the cam grooves 18 and 19 are curved along the circumferential direction, the diameter-direction widths of the cam grooves 18 and 19 become almost uniform in circumferential direction.

Uniform shapes involve a shape, such as an oval shape, in which the inside and outside diameter walls of the cam grooves are slightly projected circumferentially to inside or outside in diameter direction.

Accordingly, in case of FIG. 10, the fixed cam plate 9 and the movable cam plat 4 can be formed to have such dimensions that the diameters thereof are slightly larger than the widths of the cam grooves 18 and 19. As a result, it is not necessary to secure large space to form cam grooves as seen in the case of forming conical cam grooves and it is, therefore, possible to make the plane size of each of the fixed cam plate 9 and the movable cam plate 4 small. Consequently, it is possible to make the entire cam mechanism small in size.

Furthermore, the distance between a pair of inside and outside diameter walls of the cam grooves which walls are ellipsoidal and are opposite each other in diameter direction, i.e., the groove width in diameter direction is set almost close to the diameter of the clutch ball 20 to such an extent that the clutch ball 20 can roll in circumferential direction. Due to this, even if a centrifugal force acts on the clutch ball 20, it is possible to prevent the rolling position from being shifted by the outside diameter wall.

This can advantageously contribute to the improvement of the operating performance of the clutch device.

(6) If the inclined angle between the contact surface 1a of the clutch housing 1 and the contact surface 4a of the movable cam plate 4 is narrow, the frictional engagement force between the both contact surfaces 1a and 4a increases and a locking state becomes more stable. However, if the inclined angle is set excessively narrow in view of the locking state, the both contact surfaces 1a and 4a bite into each other. Due to this, at the time of changing over a clutch from a locking state to a non-locking state, high separation torque is required to separate the movable contact surface 4a from the fixed contact surface 1a, which influences clutch performance.

Figure 11:
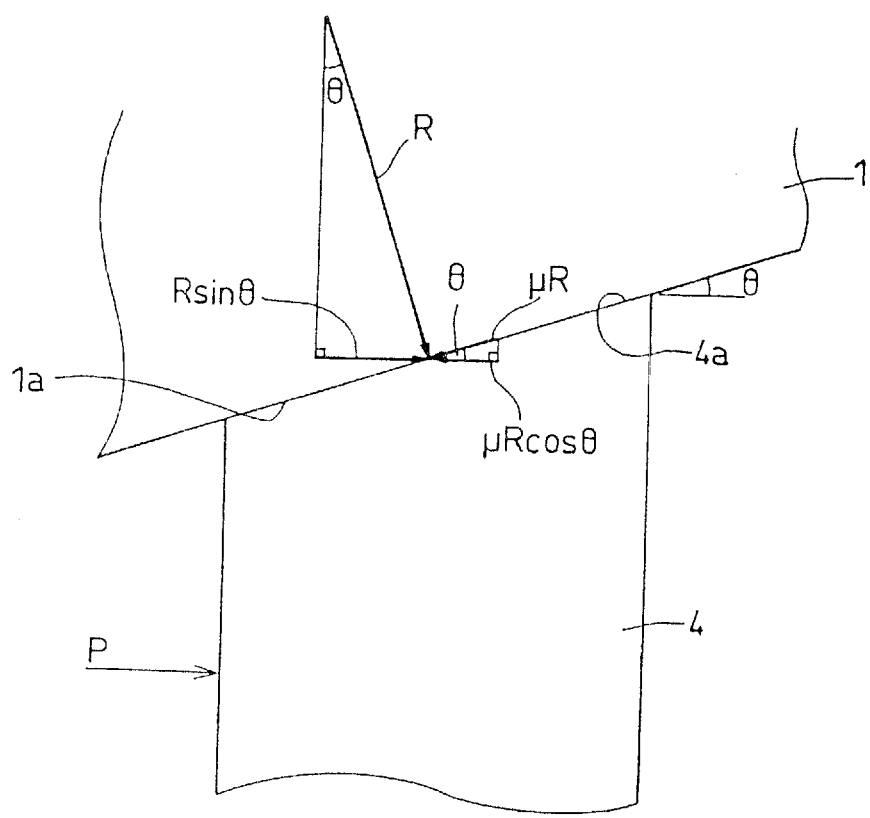
FIG. 11 is a partially side sectional view of the contact surfaces of a clutch housing and a cam plate in a clutch device according to yet another embodiment of the present invention.

According to the present invention, therefore, as will be described with reference to FIG. 11, while assuming that the inclined angle between the contact surface 1a of the clutch housing 1 and the contact surface 4a of the movable cam plate 4 is θ and a friction factor on the contact surfaces 1a and 4a is μ, the inclined angle θ may be managed based on the following relational expression:

$$\theta > \tan^{-1} \mu \qquad (d).$$

Description will now be given to how to derive the relational expression (d).

If assuming that a reactive force (or a force perpendicular to the movable contact surface 4a) acting on the movable contact surface 4a from the fixed contact surface 1a is R and an axial external force required to pull out the movable contact surface 4a from the fixed contact surface 1a is P while the movable contact surface 4a press-contacts with the fixed contact surface 1a, the following expression (e) is established:

$$P = 2\mu R \cos \theta - 2R \sin \theta = 2R(\mu \cos \theta - \sin \theta) \qquad (e).$$

In the expression, the coefficient "2" on the right side is given due to grades on both sides.

To prevent the movable contact surface 4a of the movable cam plate 4 from biting into the fixed contact surface 1a of the clutch housing 1, i.e., to allow the movable cam plate 4 to spontaneously slip out of the clutch housing, it is necessary to satisfy P<0, i.e., the following expression (f):

$$P = 2R(\mu \cos \theta - \sin \theta) < 0 \qquad (f).$$

From this expression (f), the above relational expression (d) is obtained.

If the inclined angle is managed to satisfy this relational expression (d), it is possible to prevent the inclined angle from being set too narrow to thereby cause the contact surface to bite into the contact surface so as to stabilize a locking state by decreasing the inclined angle, whereby clutch performance is stabilized.

When the inventors of the present invention conducted the following experiment in accordance with the above relational expression (d), a favorable result was obtained. Namely, if a lubricant applied between the both contact surfaces is grease or no lubricant is applied therebetween (or the contact surfaces are dried) and the inclined angle θ is managed to fall within the range of 6 to 15 degrees while the friction factor $\mu$ is set at 0.1 to 0.3, then an appropriate locking force besides the capability of preventing one contact surface from biting into the other and the stabilization of the locking state is obtained.

The friction factor is based on the setting of the surface roughness of the contact surfaces. If the surface roughness is too high, the durability of the clutch device deteriorates due to gradual abrasion with the passage of time. Taking this into consideration, the surface roughness is set such that a center line mean roughness (Ra) is preferably 0.8 in this embodiment.

The experiment conducted by the inventors as stated above will be described with reference to FIGS. 12 to 14.

Figure 13:
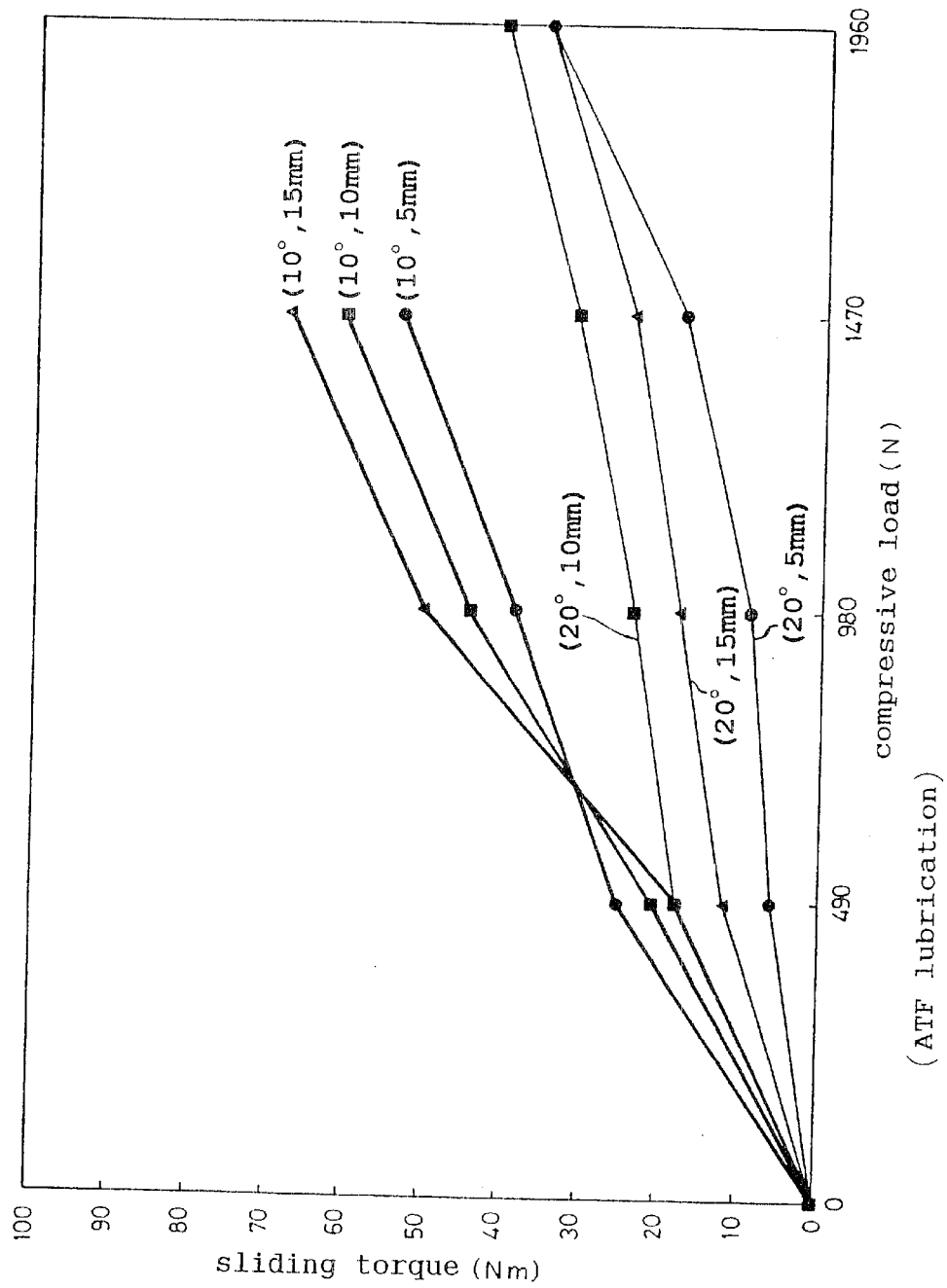
FIG. 13 shows the relationship between compressive load and sliding torque in case of ATF lubrication in the clutch device shown in FIG. 11.

FIGS. 12 and 13 show compressive load exerted on the fixed contact surface 1a from the movable contact surface 4a in a locking state and sliding torque with which the movable contact surface 4a slides on the fixed contact surface 1a if a rotational torque is applied to the movable contact surface 4a under the compressive load. In case of FIG. 12, a lubricant on the contact surfaces is grease. In case of FIG. 13, a lubricant on the contact surfaces is ATF (short for Automatic Transmission Fluid). In FIGS. 12 and 13, respective lines indicate the following:

A thin line with marks of black-painted circles indicates a case of an inclined angle of 20 degrees and a contact length between contact surfaces of 5 mm.

A thin line with marks of black-painted rectangles indicates a case of an inclined angle of 20 degrees and a contact length between contact surfaces of 10 mm.

A thin line with marks of black-painted triangles indicates a case of an inclined angle of 20 degrees and a contact length between contact surfaces of 15 mm.

A thick line with marks of black-painted circles indicates a case of an inclined angle of 10 degrees and a contact length between contact surfaces of 5 mm.

A thick line with marks of black-painted rectangles indicates a case of an inclined angle of 10 degrees and a contact length between contact surfaces of 10 mm.

A thick line with marks of black-painted triangles indicates a case of an inclined angle of 10 degrees and a contact length between contact surfaces of 15 mm.

A dotted line with marks of void circles indicates a case of an inclined angle of 5 degrees and a contact length between contact surfaces of 5 mm.

A dotted line with marks of void rectangles indicates a case of an inclined angle of 5 degrees and a contact length between contact surfaces of 10 mm.

A dotted line with marks of void triangles indicate a case of an inclined angle of 5 degrees and a contact length between contact surfaces of 15 mm.

In FIGS. 12 and 13, if the inclined angle is wide, the sliding torque becomes low and the stability of the locking state deteriorates. If the inclined angle is narrow, the sliding torque becomes high and the stability of the locking state improves.

If the inclined angle is narrow or, in particular, 5 degrees, the sliding torque becomes quite high following an increase in compressive load. As a result, the both contact surfaces 1a and 4a bite into each other instead of the locking state being stabilized. With such an inclined angle, the movable contact surface 4a is considered to press-fitted into the fixed contact surface 1a.

Figure 14:
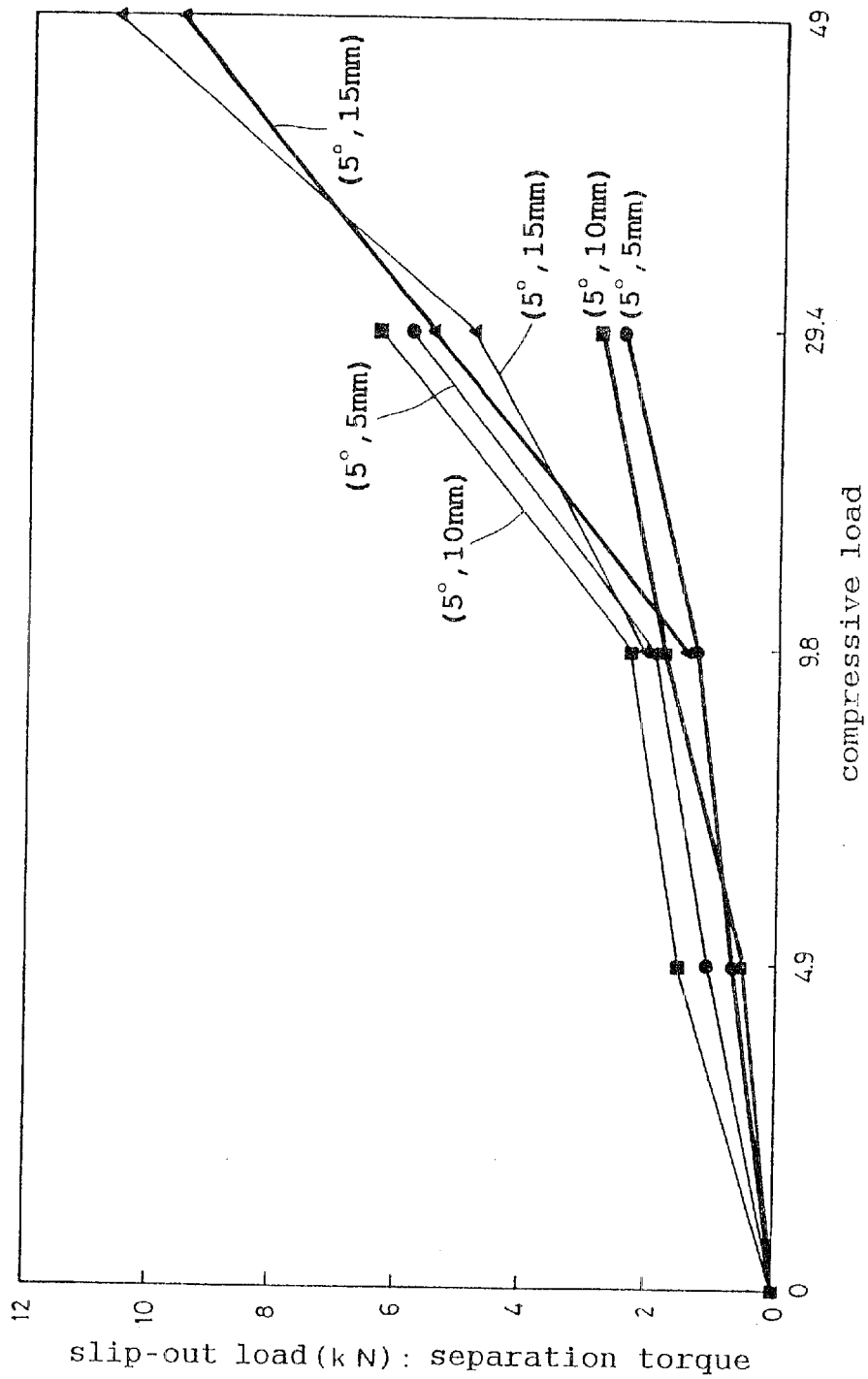
FIG. 14 shows the relationship between press-fit load and slipping-out load in the clutch device shown in FIG. 11.

FIG. 14 shows a case where the inclined angle is as narrow as 5 degrees and the biting between the both contact surfaces 1a and 4a thereby occurs. In FIG. 14, the horizontal axis indicates press-fit load and the vertical axis indicates separation torque. The press-fit load is a load required to press-fit the movable contact surface 4a into the fixed contact surface 1a. The separation torque is torque required to separate the movable contact surface 4a from the fixed contact surface 1a. In FIG. 14, respective lines indicate the following:

A thin line with marks of black-painted circles indicates a case of ATF lubrication, an inclined angle of 5 degrees and a contact length of 5 mm.

A thin line with marks of black-painted rectangles indicates a case of ATF lubrication, an inclined angle of 5 degrees and a contact length of 10 mm.

A thin line with marks of black-painted triangles indicates a case of ATF lubrication, an inclined angle of 5 degrees and a contact length of 15 mm.

A thick line with marks of black-painted circles indicates a case of grease lubrication, an inclined angle of 5 degrees and a contact length of 5 mm.

A thick line with marks of black-painted rectangles indicates a case of grease lubrication, an inclined angle of 5 degrees and a contact length of 10 mm.

A thick line with marks of black-painted triangles indicates a case of grease lubrication, an inclined angle of 5 degrees and a contact length of 15 mm.

Compared with the ATF lubrication, separation torque is slightly low in case of grease lubrication.

Judging from the above, if the inclined angle is narrower or the contact length is larger, the locking force becomes higher.

Furthermore, if attention is paid only to the locking force, it is preferable to set the inclined angle to be narrower. However, if the inclined angle is too narrower, the separation torque becomes higher due to the biting between the contact surfaces and clutch performance response undesirably lowers.

(7) As will be described hereinafter with reference to FIGS. 15 and 16, an angle for allowing the both contact surfaces 1a and 4a to secure a required diameter-direction clearance S during the rotation of the first rotary shaft 2, is assumed as the lower limit angle and an angle for allowing starting torque required to separate the contact surface 4a of the movable cam plate 4 from the contact surface 1a of the clutch housing 1 to be suppressed to not more than a required level, is assumed as the upper limit angle.

Further, according to the present invention, if the inclined angle η of the cone-shaped inclined surfaces of the cam grooves 18 and 19 is specified to fall within the range between the lower and upper angles stated above, the inclined angle η may be appropriately specified with respect to the diameter-direction clearance S between the both contact surfaces 1a and 4a using the following relational expression (g):

$$\eta = \tan^{-1}(S/K) \qquad (g),$$

where K is a constant.

This constant K is derived from an expression of $K=(D_C-D_B \cdot \sin \phi) \cdot \tan \theta$ while it is assumed that the contact angle between the both contact surfaces is θ, the circumferential outside diameter of the cam groove is $D_C$, the diameter of the clutch ball 20 is $D_B$ and the cam stopper angle is φ.

Here, the cam stopper angle φ is an angle formed between the stepped portion a of the cone-shaped inclined surface 19a2 and an axial line passing the center of the clutch ball 20 in, for example, a state in which the clutch ball 20 is put between the cone-shaped inclined surface 18a2 of the cam groove 18 and the cone-shaped inclined surface 19a2 of the cam groove 19.

Description will now be given to how to derive the above relational expression (g).

Figure 15:
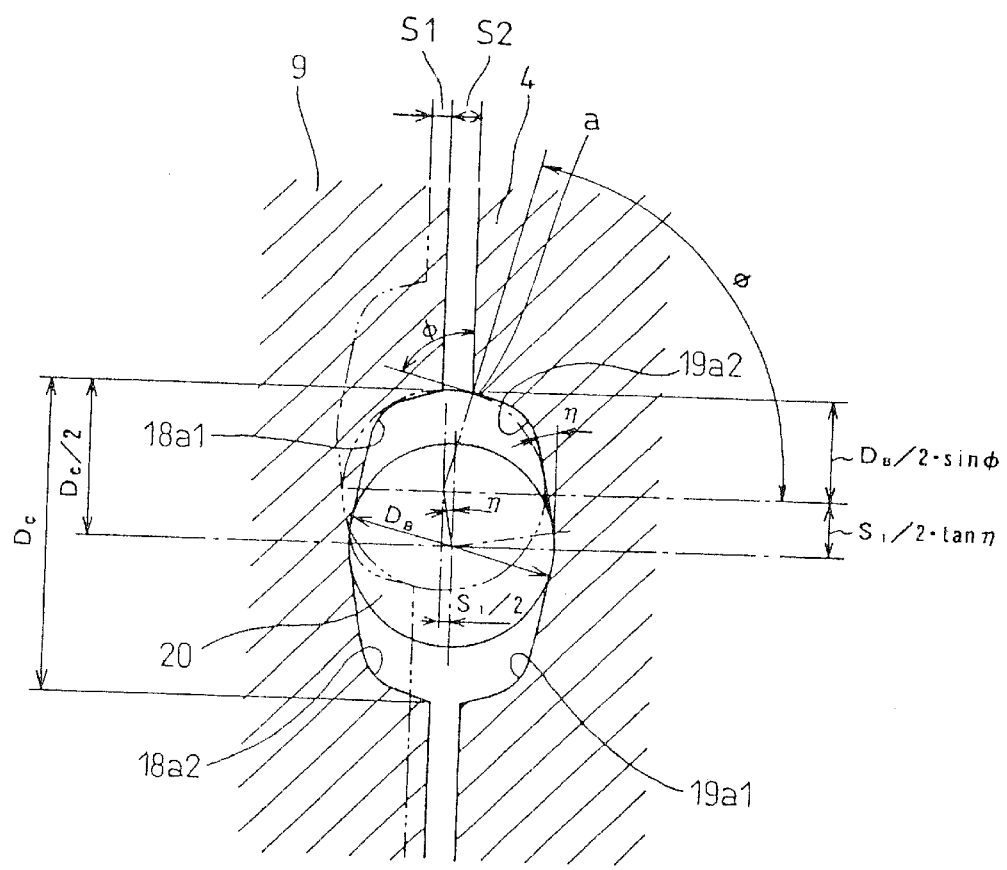
FIG. 15 is an enlarged view of the important parts of a cam mechanism in a clutch device according to yet another embodiment of the present invention.

The largest axial movement quantity S1 of the first rotary shaft 2 is obtained as $S1=(D_C-D_B \sin \phi) \cdot \tan \eta$ as is obvious from FIG. 15.

Figure 16:
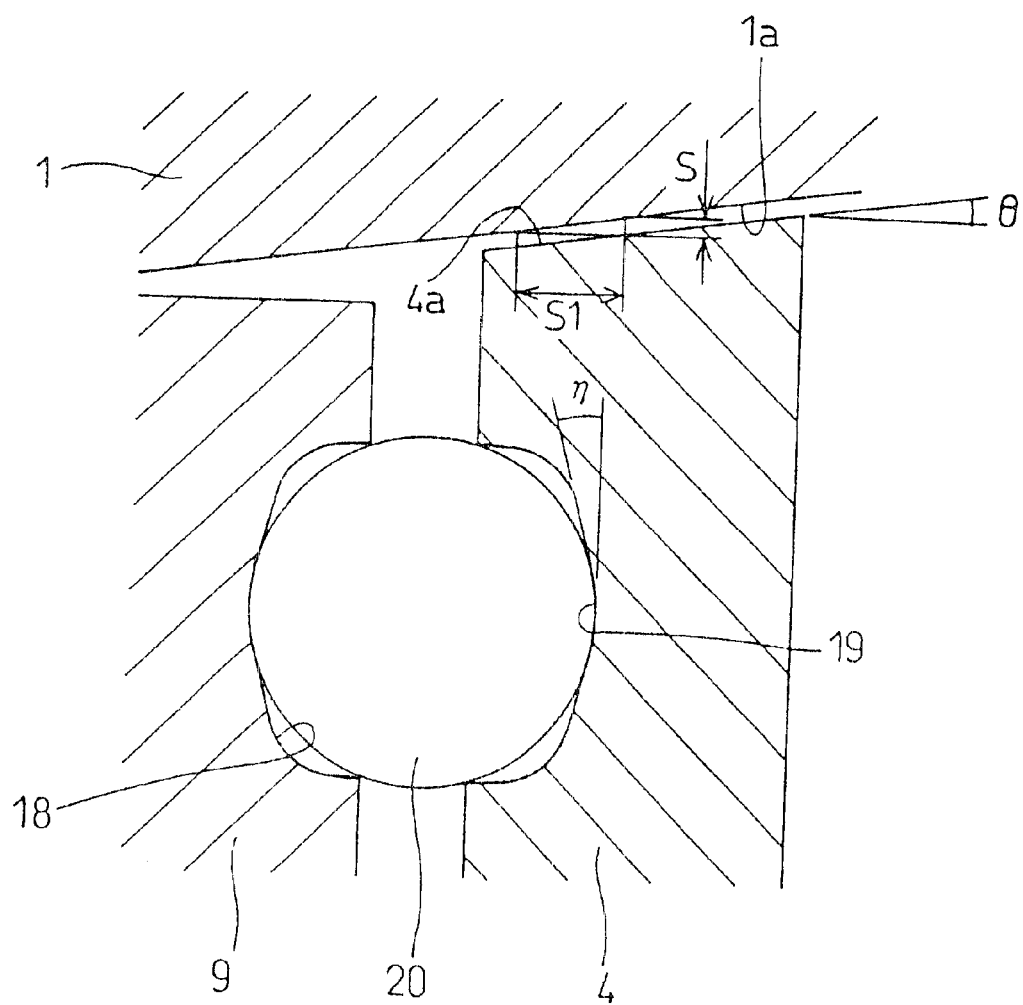
FIG. 16 is a partially side sectional view of the important parts of a clutch housing and a cam plate in the clutch device shown in FIG. 15, which view is used to explain a relational expression between the inclined angle of the cam groove of the clutch device and the clearance between both contact surfaces in diameter direction.

Also, since the diameter-direction clearance S between the both contact surfaces 1a and 4a corresponds to the axial movement quantity S1 of the movable cam plate 4 as is obvious from FIG. 16, the clearance S is obtained as $S=S1 \cdot \tan \theta$.

Based on the above two expressions, the clearance S is obtained as $S=(D_C-D_B \sin \theta) \cdot \tan\eta \cdot \tan\theta = K \cdot \tan\eta$ and the expression is modified to thereby make it possible to derive the expression (1).

It is noted that the inclined angle η of the cone-shaped inclined surface of each of the cam grooves 18 and 19 is preferably in the range of 6 to 15 degrees according to the expression (g).

In this case, the diameter-direction clearance S between the both contact surfaces 1a and 4a is specified to not less than 0.15.

With such a diameter-direction clearance S and the constant K, it is preferable to specify the contact angle θ between the both contact surfaces 1a and 4a to 3 to 15 degrees so as to prevent the contact surfaces 1a and 4a from biting into each other. Likewise, it is preferable to specify the cam stopper angle φ to about 70 degrees so as to prevent the clutch ball 20 from running upon the cam grooves 18 and 19.

If the inclined angle 7 of each of the cam grooves 18 and 19 is appropriately specified according to the relational expression (g), the diameter-direction clearance S between the contact surfaces 1a and 4a can be appropriately specified as well. As a result, it is possible to reduce starting torque for separating the movable contact surface 4a from the fixed contact surface 1a since the biting of the both contact surfaces 1a and 4a is prevented and, at the same time, the inclined angle can secure the separation distance between the contact surfaces 1a and 4a in power transmission and transmission efficiency for transmitting the power from the first rotary shaft 2 to the second rotary shaft 3 improves. As a result, the clutch device can fulfill desired clutch performance.

Moreover, since the diameter-direction clearance S is appropriately specified, it is possible to ensure setting the second rotary shaft 3 in an irrotational state, which is preferable for the improvement of clutch performance.

According to the present invention, while assuming that the contact angle between the both contact surfaces 1a and 4a is θ, the circumferential length of the cam grooves 18 and 19 is $D_C$, the diameter of the clutch ball is $D_B$, the cam stopper angle is φ and the above-stated constant K is derived from the expression of $(D_C-D_B \cdot \sin \phi) \cdot \tan \theta$, if the contact angle θ, for example, included in the constant is appropriately specified to allow preventing the biting between the both contact surfaces 1a and 4a, the inclined angle η of each of the cam grooves 18 and 19 can be advantageously, more accurately and more easily specified to an appropriate value.

(8) According to the present invention, the disc spring 5 may be replaced by a compression coil spring.

(9) According to the present invention, the movable frictional member should not be limited to a plate structure such as the movable cam plate 4.

(10) According to the present invention, the fixed frictional member should not be limited to a housing structure such as the clutch housing 1.

(11) According to the present invention, the fixed cam plate 9 is provided, as a flange directed outward in diameter direction, integrally with the outer periphery of the first rotary shaft 2. Alternatively, this fixed cam plate 9 may be formed separately from the first rotating body and attached to the first rotating body without moving the axial direction, thereby integrating the fixed cam plate 9 with the first rotating body.

(12) According to the present invention, the above-stated clutch device can be applied to, for example, an infinite variable-speed drive, an electric power steering or the other machines.

Probability of Industrially Utilizing the Invention

According to the present invention, the clutch device is appropriately utilized as a clutch device inserted between the power transmissions of two rotating bodies concentrically provided to be opposite each other, coupling the both rotating bodies so that the rotating bodies can rotate synchronously with each other when rotational power is inputted into the first rotating body and turning the second rotating body into an irrotational state when rotational power is inputted to the second rotating body.

What is claimed is:

1. A clutch device for coupling two rotating bodies provided to be opposite each other almost concentrically so as to be synchronously rotatable when rotational power is inputted into a first rotating body out of the two rotating bodies, and for cutting off rotational power to the first rotating body when the rotational power is inputted into a second rotating body out of the two rotating bodies, the clutch device comprising:

a movable frictional member rotatable synchronously with the second rotating body, and attached to be displaceable in an axial direction;

a fixed frictional member fixedly arranged at a position at which the movable frictional member is press-contacted with or separated from the fixed frictional member depending on a displacement of the movable frictional member in the axial direction; and a cam mechanism for separating the movable frictional member from the fixed frictional member, integrating the first rotating body, the movable frictional member and the second rotating body with one another and coupling the first and second rotating bodies to be synchronously rotatable when the first rotating body rotates, and for press-contacting the movable frictional member with the fixed frictional member, integrating the second rotating body, the movable frictional member and the fixed frictional member with one another and turning the second rotating body into an irrotational state when the second rotating body rotates.

2. The clutch device according to claim 1, wherein the movable frictional member has an outer peripheral surface consisting of an annular plate having a contact surface, a diameter of the contact surface becoming larger toward one side in the axial direction;

the fixed frictional member has an inner peripheral surface formed as a contact surface, a diameter of the contact surface becoming larger toward one side in the axial direction, and has an inner peripheral surface consisting of a cylindrical body concentrically provided on the outer peripheral surface of said movable frictional member; and if said movable frictional member is displaced in the axial direction, the contact surface of the movable frictional member is turned into a state of being press-contacted with or separated from the contact surface of said fixed frictional member.

3. The clutch device according to claim 1, wherein the cam mechanism includes a pair of cam grooves provided on opposite surfaces of the movable frictional member and a fixed cam plate provided integrally with the first rotating body without moving in the axial direction, and a clutch ball contained in the pair of cam grooves and rolling in the pair of cam grooves to thereby displace the movable frictional member in the axial direction.

4. The clutch device according to claim 1, wherein said cam mechanism includes a pair of cam grooves provided on opposite surfaces of the movable frictional member and a fixed cam plate provided integrally with the first rotating body without moving in the axial direction, and a cam-shaped convex portion; and said cam-shaped convex portion slides in said cam grooves in circumferential direction, thereby displacing the movable frictional member to be press-contacted or separated from the fixed frictional member.

5. The clutch device according to claim 3, wherein an urging member for elastically urging the movable frictional member toward a side of being press-contacted with the fixed frictional member, is attached.

6. The clutch device according to claim 5, wherein one of said pair of cam grooves is provided with an inclined surface having a smaller depth toward at least one side in the circumferential direction, and the other cam groove of said pair of cam grooves is provided with an inclined surface having a smaller depth toward at least the other side in the circumferential direction; and the depth of each said cam groove at a deepest position is set to be smaller than a radius of the clutch ball, and the depth of each cam groove at a shallowest position is set to prevent the clutch ball from slipping out of the cam grooves.

7. The clutch device according to claim 5, wherein the cam grooves are shaped such that groove widths in the diameter direction are set to suppress rolling of the clutch ball in the diameter direction from exceeding a required level and are almost uniform in the circumferential direction; and one of the cam grooves is provided with an inclined surface having a smaller depth toward at least one side in the circumferential direction, and the other cam groove is provided with an inclined surface having a smaller depth toward at least the other side in the circumferential direction.

8. The clutch device according to claim 7, wherein said both cam grooves have an ellipsoidal shape longer in the circumferential direction and shorter in the diameter direction.

9. The clutch device according to claim 2, wherein each of the contact surfaces of the fixed and movable frictional members has a conical surface shape and an inclined angle θ of each contact surface is managed based on a relational expression of $\theta > \tan^{-1}\mu$, while assuming that a friction factor on said contact surface is $\mu$.

10. The clutch device according to claim 9, wherein said inclined angle θ is managed to fall within a range of 6 to 15 degrees by setting said friction factor $\mu$ at 0.1 to 0.3.

11. The clutch device according to claim 5, wherein in case of the inclined angle of said each cam groove is specified to fall within a range between an angle for allowing said both contact surfaces to secure required space in the diameter direction during rotation of the first rotating body and an angle for allowing suppressing starting torque required to separate the contact surface of the movable frictional member from the contact surface of the fixed frictional member to not more than a required level, the inclined angle is specified according to the following relational expression (1) with respect to the diameter-direction clearance between said both contact surfaces:

$$\eta = \tan^{-1}(S/K) \qquad (1),$$

where η: the inclined angle of the cam groove,

S: the diameter-direction clearance between said both contact surfaces, and

K: a constant.

12. The clutch device according to claim 11, wherein the inclined angle of said cam groove is specified to fall within a range of 6 to 15 degrees.

* * * * *